(12) United States Patent
Black et al.

(10) Patent No.: US 12,706,926 B2
(45) Date of Patent: Aug. 11, 2026

(54) DETECTION OF INFORMATION CONCEALMENT AND MITIGATION VIA INTRODUCTION OF DELIBERATE VARIANCE

(71) Applicant: Google LLC, Mountain View, CA (US)

(72) Inventors: James Paul Black, Sunnyvale, CA (US); Jacques Mouton, Tampa, FL (US); Radhika Ravindranath, South Plainfield, NJ (US); Dev Narendrabhai Patel, Ahmedabad (IN)

(73) Assignee: GOOGLE LLC, Mountain View, CA (US)

( * ) Notice: Subject to any disclaimer, the term of this patent is extended or adjusted under 35 U.S.C. 154(b) by 215 days.

(21) Appl. No.: 18/600,468

(22) Filed: Mar. 8, 2024

(65) Prior Publication Data

US 2025/0286898 A1 Sep. 11, 2025

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/1425* (2013.01)

(58) Field of Classification Search
CPC . H04L 63/1416; H04L 63/1425; H04L 63/14; H04L 63/1466; G06N 20/00; G06F 21/55
See application file for complete search history.

(56) References Cited

U.S. PATENT DOCUMENTS

2008/0034425 A1* 2/2008 Overcash ................ G06F 21/55 726/22
2012/0102143 A1* 4/2012 Mandre ............... H04L 63/0478 709/217

(Continued)

FOREIGN PATENT DOCUMENTS

CN 111478922 7/2020

OTHER PUBLICATIONS

Askarov et al., "Predictive Black-Box Mitigation of Timing Channels", 17$^{th}$ ACM Conference on Computer and Communications Security (CCS), Oct. 4-8, 2010, Chicago, Illinois, 12 pages.

(Continued)

*Primary Examiner* — Mohamed A. Wasel
(74) *Attorney, Agent, or Firm* — DORITY & MANNING P.A.

(57) ABSTRACT

Network information is obtained for a plurality of discrete information units transmitted by a transmitting entity. The network information is descriptive of features of network events that occurred for the discrete information units. The network information is processed with a machine-learned hidden information detection model to obtain a prediction output indicating that the features of the network events that occurred for the discrete information units are modulated to conceal hidden information. Based on the prediction output, a variance addition process is caused to be performed for a second plurality of discrete information units to be transmitted by the transmitting entity. The variance addition process causes variance to be added to features of future (Continued)

network events for at least some of the second plurality of discrete information units.

20 Claims, 5 Drawing Sheets

(56) References Cited

U.S. PATENT DOCUMENTS

| | | | | |
|---|---|---|---|---|
| 2019/0007447 | A1* | 1/2019 | Barnes | H04L 67/104 |
| 2025/0039067 | A1* | 1/2025 | Crabtree | H04L 43/028 |
| 2025/0047698 | A1* | 2/2025 | Rund | H04L 63/1425 |
| 2025/0323928 | A1* | 10/2025 | Crabtree | H04L 63/1433 |

OTHER PUBLICATIONS

Extended European Search Report for Application No. EP 25162696.6, mailed Aug. 11, 2025, 11 pages.
Li et al., "Generic and Sensitive Anomaly Detection of Network Covert Timing Channels", IEEE Transactions on Dependable and Secure Computing, vol. 20, No. 5, Sep.-Oct. 2023, 16 pages.
Lucena et al., "Covert Channels in IPV6", Privacy Enhancing Technologies, Lecture Notes in Computer Science, vol. 3856, 2006, 20 pages.
Wendzel et al., "A Pattern-based Survery and Categorization of Network Covert Channel Technologies", arXiv:1406.2901v2, Mar. 19, 2015, 27 pages.
Common Weakness Enumeration, https://ewe.mitre.org/data/definitions/514.html, retrieved on Mar. 27, 2025, 2 pages.
Juffman et al., "Multi-pass Microscopy for Quantum State Engineering", Nature Communications 7, Sep. 27, 2016, 5 pages.

* cited by examiner

DETECTION OF INFORMATION CONCEALMENT AND MITIGATION VIA INTRODUCTION OF DELIBERATE VARIANCE

FIELD

The present disclosure relates generally to detecting and mitigating information concealment. More specifically, the present disclosure relates to detecting concealed information and mitigating such concealment via introduction of deliberate variance.

BACKGROUND

The process of stealing sensitive information can be thought of as involving two steps: gaining access to sensitive information, and retrieving sensitive information. To gain access to sensitive information, a malicious entity can first overcome security measures implemented by a secured system that mediates access to the sensitive information. The malicious entity can use some information retrieval technique to extract the sensitive information outside of the secured system. The information retrieval technique that is used can vary based on the objective of the malicious entity.

Specifically, some techniques used to retrieve sensitive information optimize for speed by foregoing attempts to obfuscate evidence that the security breach occurred, and that sensitive information was stolen. Conversely, other information retrieval techniques forego speed in favor of obfuscation and concealment, such as steganography (i.e., concealing sensitive information within unsecured information leaving the system via "normal" non-secret channels). By concealing or obfuscating evidence that the sensitive information was extracted, malicious entities can lower the probability that their access to the secured system is revoked. In turn, continued and undetected access to the secured system can enable a malicious entity to steal large quantities of sensitive information.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining network information for a plurality of discrete information units transmitted by a transmitting entity, wherein the network information is descriptive of features of network events that occurred for the plurality of discrete information units. The method includes processing, by the computing system, the network information with a machine-learned hidden information detection model to obtain a prediction output indicating that the features of the network events that occurred for the plurality of discrete information units are modulated to conceal hidden information. The method includes, based on the prediction output, causing, by the computing system, a variance addition process to be performed for a second plurality of discrete information units to be transmitted by the transmitting entity, wherein the variance addition process causes variance to be added to features of future network events for at least some of the second plurality of discrete information units.

Another example aspect of the present disclosure is directed to a computing system one or more processors and one or more non-transitory computer-readable media that store instructions that, when executed by the one or more processors, cause the computing system to perform operations. The operations include obtaining network information for a plurality of packets transmitted by a transmitting entity, wherein the network information is descriptive of features of network events that occurred during transmission of the plurality of packets. The operations include extracting one or more feature tuples for one or more packets of the plurality of packets, wherein each of the one or more feature tuples is indicative of the features of the network events that occurred for the plurality of packets. The operations include processing the one or more feature tuples with a machine-learned hidden information detection model to obtain a prediction output that identifies one or more modulated features from features included in the one or more feature tuples, and wherein the one or more modulated features are modulated to conceal the hidden information. The operations include obtaining information indicative of a second plurality of packets for transmission by the transmitting entity. The operations include, based on the prediction output, causing a variance addition process to be performed for the second plurality of packets, wherein the variance addition process causes variance to be added to the features of future network events for at least some of the second plurality of packets.

Another example aspect of the present disclosure is directed to one or more non-transitory computer-readable media that store instructions that, when executed by one or more processors, cause the one or more processors to perform operations. The operations include obtaining network information for a plurality of discrete information units transmitted by a transmitting entity, wherein the network information is descriptive of features of network events that occurred for the plurality of discrete information units. The operations include processing the network information with a machine-learned hidden information detection model to obtain a prediction output indicating that the features of the network events that occurred for the plurality of discrete information units are modulated to conceal hidden information. The operations include, based on the prediction output, causing a variance addition process to be performed for the transmitting entity, wherein the variance addition process causes variance to be added to features of future network events for future transmissions of discrete information units by the transmitting entity.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
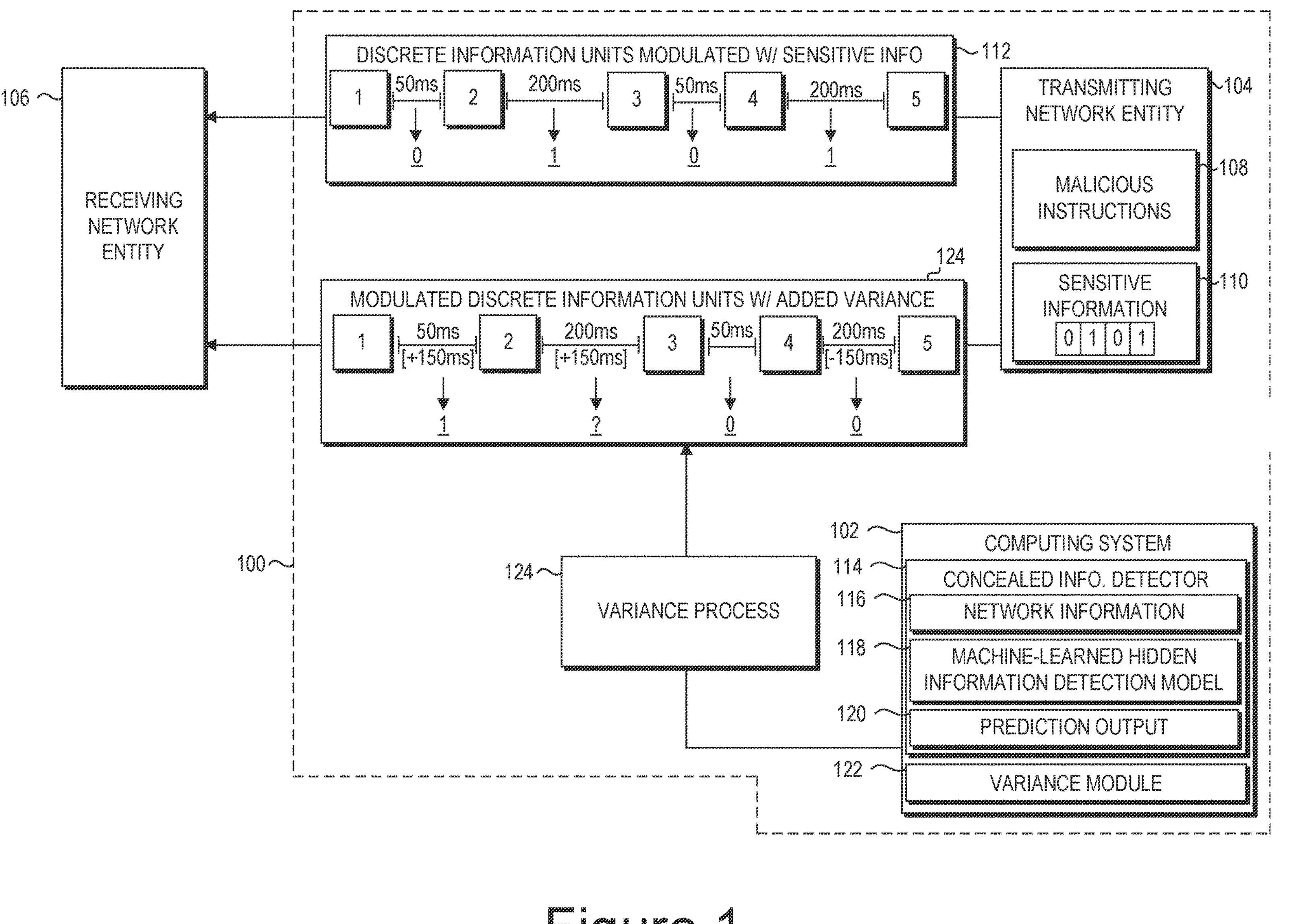
FIG. 1 is an overview block diagram for detection of covert channels and mitigation via introduction of deliberate variance according to some implementations of the present disclosure.

Reference numerals that are repeated across plural figures are intended to identify the same features in various implementations.

DETAILED DESCRIPTION

Generally, the present disclosure is directed to detecting and mitigating covert channels. More specifically, the present disclosure relates to detecting concealed channels and mitigating such channels via introduction of deliberate variance. As described previously, when breaching a secured system to extract sensitive information, malicious entities can select information extraction techniques that conceal or obfuscate evidence that the system was breached, thus lowering the probability that the breach is detected. If the breach remains undetected, the malicious entity can continue to extract large quantities of sensitive information.

In secured systems, information entering and leaving the system is logged and monitored so that attempts to extract information outside of the secured system are detected and mitigated. As such, methods to retrieve sensitive information that emphasize obfuscation and concealment must avoid such detection attempts. An increasingly popular steganographic technique employed to avoid detection has the malicious entity encode sensitive information by modulating various characteristics of discrete units of information, such as packets, as they are transmitted from the secured system.

More specifically, once a malicious actor has gained access to a secured system, the malicious actor can modify certain temporal characteristics of information leaving the system (e.g., adding delay between transmission of packets, modifying the number of maximum hops for a packet, etc.). These temporal characteristics are already somewhat variable due to the complexities inherent to wireless communications, and as such, additional variance added by a malicious entity to encode information is difficult to detect.

For example, packets transmitted from a secured system to a specific receiving device may have a predictable transit time based on known packet routing rules. However, a malicious entity that has gained access to a secured system can modify the route taken by packets transmitted from the system to the receiving device. By modifying the routes of certain packets to lengthen travel time for the packet, a malicious entity can covertly encode and transmit a binary stream of information based on the timing of packets received by the receiving entity, with a “late” packet having one binary value while an “on-time” packet has another binary value.

Encoding sensitive information in the timing of discrete units of data has proven to be an efficient and effective technique to covertly retrieve information from a secured system. Further, conventional security entities have struggled to detect such techniques. This difficulty is exacerbated by the natural variance inherent to the timing of discrete data units. In other words, the timing of packet delivery is already highly variable, which makes purposeful variance difficult to detect. Furthermore, severing the connection of an entity falsely assumed to be malicious can cause significant disruptions to the entity in question. As such, effective techniques to detect and/or mitigate these techniques are highly desired.

Accordingly, implementations of the present disclosure propose detection of covert channels and mitigation of malicious activity via introduction of deliberate variance. More specifically, a computing system can obtain network information. The network information (e.g., network logs, etc.) can describe network events that occurred for some (or all) of a set of discrete information units, or packets, transmitted from a transmitting entity (e.g., a network device, a server system, etc.) to a receiving entity (e.g., a user device, a different network device or server system, etc.) via a communication channel. As described herein, a “discrete information unit” generally refers to a packet or some analogous form of information unit, and may be referred to interchangeably as a packet or discrete information unit herein. A “network event” refers to any time at which an action occurs in relation to the discrete information unit (e.g., transmission, reception, etc.).

The computing system can process the network information with a machine-learned hidden information detection model to detect the presence of concealed information. More specifically, the machine-learned hidden information detection model can generate a prediction output indicating that characteristics of some network events of the packets have been modulated by a malicious entity to conceal hidden information. For example, packets can be configured with hop limits by the secured system. Hop limits control the maximum number of hop network events (e.g., movements from one network entity to another) that can be performed during transmission of a packet to the receiving device. The malicious entity can covertly increase the hop limit of some of the packets to include unnecessary hops, and the number of unnecessary hops can encode hidden information.

Once such behavior has been detected, the computing system can take steps to mitigate further information extraction by the malicious entity. Specifically, the computing system can identify a subsequent set of packets that are to be transmitted by the transmitting entity. The computing system can cause a variance process to be performed to the subsequent set of packets. The variance process can randomize characteristics of future network events for some (or all) of the subsequent set of packets. For example, if three hops are planned for a particular packet, the variance process can insert a random fourth hop at some point in the sequence. Additionally, or alternatively, the variance process may randomly delay occurrence of a transmission event for a packet, modify the sequence number of a packet, modify the maximum hop value for a packet, etc.

By adding variance to the being characteristics utilized by malicious entities to conceal hidden information, the computing system can obfuscate the hidden information itself, rendering the hidden information unrecoverable to the malicious entities and thus preserving the secrecy of the sensitive information. Thus, aspects of the present disclosure operate to detect the use of transmission characteristics (e.g., packet timing characteristics) by a malicious entity to extract secure information from a secured system in a covert manner. In response, for example, the computing system can add additional variance to such transmission characteristics to obfuscate the hidden information or otherwise disrupt the ability of the malicious entity to extract the secure information.

Implementations of the present disclosure provide a number of technical effects and benefits. As one example technical effect and benefit, implementations described herein enables more accurate detection of attempts by malicious entities to modulate discrete information packets with hidden information. Specifically, due to the stochastic nature of network events, conventional techniques used to detect purposeful modulation of discrete information units are computationally expensive and exhibit relatively poor performance. Further, conventional corrective actions taken in response to a false positive (e.g., severing a network connection) can cause significant disruptions. For example, if a connection used by a service provider to conduct secure financial transactions is severed due to a false positive detection of hidden information, the severed connection can cause substantial disruptions to the service provider.

However, implementations described herein can effectively detect information extraction attempts and can perform corrective actions to deny further attempts to extract information by malicious entities. Furthermore, these corrective actions can be performed without needing to sever connections, thus obviating a substantial risk associated with detection of false positives. In this manner, implementations described herein enable substantially more effective and computationally efficient detection of information concealment attempts while obviating the substantial disruptions caused by severing connections for false positives.

With reference now to the Figures, example implementations of the present disclosure will be discussed in further detail.

FIG. 1 is an overview block diagram for detection of covert channels and mitigation via introduction of deliberate variance according to some implementations of the present disclosure. More specifically, a secured network 100 can include a computing system 102 and a transmitting network entity 104 that exchanges information with a receiving network entity 106. The secured network 100 can generally be, or include, some or all of the hardware and/or software resources collectively utilized to facilitate the exchange of information between the transmitting network entity 104 and the receiving network entity 106. The secured network 100 can be or otherwise include any type or manner of network, such as wireless network(s), wired network(s), Local Area Network(s) (LANs), ad-hoc network(s), private network(s), cloud network, etc.

The secured network 100 can include the computing system 102. The computing system 102 can be physical and/or virtualized computing device(s) utilized within a communications network, such as a network node, a network device (e.g., a modem, a router, etc.), etc. The computing system 102 can facilitate the exchange of information between the transmitting network entity 104 and the receiving network entity 106. As described herein, a "network entity" can refer to any type or manner of device that exchanges information over a network (e.g., a local network, a wireless network, etc.), such as a user device (e.g., a smartphone, laptop, etc.), an Internet-of-Things (IoT) device, a network device (e.g., a modem, a router, etc.), etc.

To facilitate the exchange of information between the transmitting network entity 104 and the receiving network entity 106, the computing system 102 can analyze information being exchanged between the network entities. As an example, assume that the secured network 100 is a private enterprise network, such as a network implemented by a corporation for use by employees. The transmitting network entity 104 can be a server system located on the premises of the corporation that exchanges information with other entities via the secured network 100, such as the receiving network entity 106. The computing system 102 can implement various security features and services to protect the secured network 100 from unauthorized access by malicious entities.

The receiving network entity 106 can be a network entity located either "inside" or "outside" the secured network 100. As described herein, a device located "outside" of a network generally refers to a device that is not communicatively connected to or otherwise integrated with the network. Conversely, a device located "inside" the network generally refers to a device that is communicatively coupled to or otherwise integrated with the network.

One function of secured networks is to mediate access to systems within the network that store sensitive information, or sensitive information that is exchanged via the secured network itself. Malicious entities often attempt to gain access to secured networks with the purpose of extracting this sensitive information. Once a malicious entity has gained access to a secured network, the malicious entity can decide whether to employ a detectable information retrieval technique or a concealed information retrieval technique. A detectable information retrieval technique can be employed to quickly extract large quantities of information at the cost of exposing the malicious entity's access to the secured network. However, detection of intrusion generally leads to security vulnerabilities leveraged by the malicious entity being fixed, thus causing the malicious entity to lose access to the secured network.

As such, a malicious entity who prefers to retain access to a secured network can employ a concealed information retrieval technique. Such techniques conceal the extraction of sensitive information to retain unauthorized network access at the cost of reducing the bandwidth of information extraction. For example, a concealed information retrieval technique may encode small portions of the hidden information into ordinary information being transmitted outside of the secured network, thus enabling external retrieval of the encoded information with minimal risk of detection.

One concealed information retrieval technique employed by malicious entities creates a "covert channel" by modulating sensitive information within the "features" of "network events" that occur during transmission of non-sensitive information by the transmitting network entity 104. In other words, features (e.g., timestamps, etc.) of network events (e.g., transmitting a packet to a router device, etc.), can be covertly modified by a malicious entity to hide portions of sensitive information. For example, if a series of packets is to be transmitted by the transmitting network entity 104, the malicious entity can modulate the sensitive information by adding an artificial delay to the transmission of particular packets. In this manner, the malicious entity can extract sensitive information without modifying the content of information being transmitted from the transmitting network entity 104, thus substantially reducing the probability of detection.

To follow the depicted example, assume that the receiving network entity 106 is a malicious entity located "outside" of the network 100 (e.g., a personal computer, a smartphone device, etc.). Further assume that the receiving network entity 106 gains unauthorized access to the secured network 100 for the purposes of extracting sensitive information 110 stored to the transmitting network entity 104. Using the unauthorized access to the secured network 100, the receiving network entity 106 can insert malicious instructions 108 within the transmitting network entity 104. The malicious instructions 108 can be configured to perform a concealed information retrieval process. More specifically, the malicious instructions 108 can encode portions of the sensitive information 110 within discrete information units, such as packets, which are transmitted to the receiving network entity 106 by the transmitting network entity 104.

Further assume that the receiving network entity 106 requests non-sensitive information from the transmitting network entity 104. The transmitting network entity 104 can obtain the requested information, and can break the requested information into a sequence of discrete information units 112, such as packets, which are to be transmitted to the receiving network entity 106. However, prior to transmission of the sequence of discrete information units 112, the malicious instructions 108 can encode a portion of the sensitive information 110 within the sequence of discrete information units 112.

As depicted, the portion of the sensitive information 110 can be a binary bitstream "0101", and the sequence of discrete information units 112 can include five packets with sequence identifiers 1-5. The binary bitstream "0101" can be encoded, or modulated, within the sequence of discrete information units 112 by adding an artificial delay to particular discrete information units in the sequence. Specifically, if delayed and non-delayed packets respectively represent binary values, and the packets are transmitted at regular intervals of 50 ms, the malicious instructions 108 can encode the bitstream "0101" by introducing an additional delay of 150 ms prior to transmission of packets 3 and 5 to represent the bitstream "0101."

However, the computing system 102 can implement security features to detect the modulation of the sensitive information 110 within the sequence of discrete information units 112. To do so, the computing system 102 can include a concealed information detector 114. The concealed information detector 114 can detect concealed information by processing network information 116 a machine-learned hidden information detection model 118. More specifically, the computing system 102 can obtain network information 116 that describes features of network events that occurred during transmission of the sequence of discrete information units 112. Additionally, in some implementations, the network information 116 can describe features of the sequence of discrete information units 112. For example, the transmitting network entity 104 can transmit activity logs to the computing system 102 after transmitting packets to an intermediate network node, and the intermediate network node can transmit activity logs to the computing system 102 after forwarding the packets to the receiving network entity 106.

As described herein, a "network event" generally refers to an event performed during transmission of a discrete information unit from one network entity to another network entity. For example, transmission of a discrete information unit from the transmitting network entity 104 to an intermediate router device can be a network event, and receipt of the discrete information unit by the intermediate router device can be another network event. Further, a "feature" of a network event generally refers to a measurement, value, parameter, etc. obtained for the occurrence of the network event, such as a network event timestamp, a packet identifier, an address for a receiving entity, etc.

The machine-learned hidden information detection model 118 can be trained to process the network information 116 to obtain a prediction output 120. The prediction output 120 can indicate whether features of the network events that occurred for the sequence of discrete information units 112 are modulated to conceal hidden information, such as the portion of the sensitive information 110. Additionally, in some implementations, the prediction output 120 can identify the features being modulated to conceal the hidden information. To follow the previous example, the prediction output 120 can indicate that the transmission time at which the discrete information units are transmitted from the transmitting network entity 104 is being modulated to conceal hidden information.

The computing system 102 can include a variance module 122. Based on the prediction output 120, the variance module 122 can add variance to the features of network events for sets of discrete information units transmitted subsequently from the transmitting network entity 104. More specifically, the variance module 122 can perform a variance addition process 124 for a sequence of discrete information units based on the prediction output. The variance addition process 124 can cause variance to be added to the features of future network events for the discrete information units (e.g., when the discrete information units are transmitted). In some implementations, the variance module 122 can generate the variance addition process 124 in response to the type of modulation identified by the prediction output 120.

For example, assume that the transmitting network entity 104 retrieves a second set of information based on a request from the receiving network entity 106. The transmitting network entity 104 can divide the retrieved information into a second sequence of discrete information units 126 for transmittal. As described with regards to the sequence of discrete information units 112, the second sequence of discrete information units 126 can also include packets with sequence identifiers 1-5. Prior to transmittal, the computing system 102 can utilize the variance module 122 to perform the variance addition process 124. The variance addition process can add variance to future network events for some (or all) of the second sequence of discrete information units 126.

As illustrated, the prediction output 120 can indicate that the transmission time for some of the sequence of discrete information units 112 was the feature modulated to conceal hidden information. In response, the variance module 122 can perform the variance addition process 124. The variance addition process 124 can cause variance to be added to the transmission times of discrete information units from the second sequence of discrete information units 126.

To follow the depicted example, the variance addition process 124 may instruct the transmitting network entity 104 to add an additional delay of 150 ms to the 50 ms delay between transmission of packets 1 and 2 of the second sequence of discrete information units 126. The variance addition process 124 can further instruct the transmitting network entity 104 to add an additional delay of 150 ms to the 50 ms delay between transmission of packets 2 and 3, and to reduce a planned delay of 200 ms between transmission of packets 4 and 5 by 150 ms for a total delay of 50 ms. By adding variance to the features of the network events, the variance module 122 can obfuscate the portions of the sensitive information 110 modulated into the second sequence of discrete information units 126 so that the information cannot be recovered by the receiving network entity 106.

For example, assume that the malicious instructions 108 modulates bits "0101" into the second sequence of discrete information units 126 by causing a delay of 50 ms between transmission of packets 1-2 and 3-4, and a delay of 200 ms between packets 2-3 and 4-5. However, by performing the variance addition process 124, the delay between packets 1-2 is increased from 50 ms to 200 ms, thus obfuscating the sensitive information 110 by changing the intended value modulated into the delay between transmission of the packets 1-2. For another example, the variance addition process 124 can increase the delay between packets 2-3 from 200 ms to 350 ms, thus obfuscating the value modulated into the delay between transmission of the packets 2-3. In such fashion, the variance module 122 can obfuscate "covert channels" that covertly carry modulated information to preserve the sensitive information 110 from the malicious entity.

Figure 2:
FIG. 2 is a flow diagram of an example method for detection of information concealment and mitigation via introduction of deliberate variance, in accordance with some implementations of the present disclosure.

FIG. 2 is a flow diagram of an example method 200 for detection of information concealment and mitigation via introduction of deliberate variance, in accordance with some implementations of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 200 is performed by the computing system 102 of FIG. 1. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 205, processing logic can obtain network information for a plurality of discrete information units transmitted by a transmitting entity. As described previously, a "discrete information unit" can generally refer to a specific unit, portion, etc. of information being transmitted to another location. In some implementations, a discrete information unit can refer to a packet, or a collection of packets demarcated in some manner (e.g., if an initial portion of a packet sequence is routed to one intermediate destination and a subsequent portion of the packet sequence is routed to some other intermediate destination). For example, the discrete information units can be User Datagram Protocol (UDP) packets, Transmission Control Protocol (TCP) packets, control messages (e.g., Internet Control Message Protocol (ICMP) messaging) or control signaling (e.g., signaling over a control channel), etc.

Additionally, or alternatively, in some implementations, the discrete information units can refer to a portion, or the entirety, of non-packeted information transmitted from a transmitting entity. For example, the discrete information units can refer to portions of a binary data stream transmitted over a socket connection. For another example, the discrete information units can refer to sequences of streaming data streamed from the transmitting entity. When information is not discretely packetized, such as when information is streamed from the transmitting entity, discrete portions of the streaming information can be designated as discrete information units iteratively or randomly (e.g., every five seconds of streaming data, every 100 megabytes of streaming data, etc.).

The network information can describe features of network events that occurred for the plurality of discrete information units. As described herein, a "network event" can refer to any occurrence, action, operation, etc. performed with relation to one of the discrete information units. Examples of network events can include receiving a discrete information unit, receiving a set of discrete information units, processing or parsing a discrete information unit, transmitting a discrete information unit, etc. Similarly, the features of the network events described by the network information can include parameters and/or values associated with the occurrence of the particular network event. For example, if the particular network event occurs when a packet is transmitted from the transmitting entity to an intermediate router device, the network information can describe a transmittal time, a packet size, packet hop limit, packet sequence identifier, destination port, destination IP address, WHOIS information, geolocation information, service type, originating process identifier, caller process identifier, etc.

Upon occurrence of a network event, or after occurrence of a threshold number of network events, a network entity can generate network information, such as network logs or activity logs, and can transmit the network information to the computing system. The network information received from the network entities can also describe features of processing or other actions performed by the network entity. For example, assume that an intermediate network node (e.g., a router device, etc.) receives a packet from the transmitting network entity and forwards the packet to another intermediate network node. If the packet waits in queue for 20 ms before being forwarded to the other intermediate network node, the network information received from the intermediate network entity can describe the 20 ms delay caused by the queue.

As a particular example of a network event, the occurrence of a network event can be identified when a discrete information unit of the plurality of discrete information units is received by a receiving entity, such as the target of the information or an intermediate network entity (e.g., a router device, a Cable Modem Termination System (CMTS), a network node, etc.). As another example, the occurrence of a network event can be identified when a packet hops from one network segment to another network segment. As yet another example, occurrence of a network event can be identified when a discrete information unit of the plurality of discrete information units is transmitted by the transmitting entity.

Additionally, in some implementations, the network information can describe features of the network entity, and/or discrete information units, that are associated with a network event. To follow the previous example, the network information received from the intermediate network node can describe features of the intermediate network node. Such features can include a Media Access Control (MAC) address assigned to the network node, an internal and/or external IP address for the network node, hardware and/or software resources available to the network node, historical processing information (e.g., historical packet queuing or buffering times, etc.), geolocation information, network role or assignment information, etc. Similarly, the network information received from the intermediate network node can describe features of the packet received and forwarded by the intermediate network node. Such features can include a packet type, packet hop limit, packet size, information carried in the header of the packet (e.g., sequence identifier, packet identifier, control information, etc.), packet payload information, etc.

At operation 210, processing logic can process the network information with a machine-learned hidden information detection model to obtain a prediction output. The prediction output can indicate that the features of the network events that occurred for the plurality of discrete information units are modulated to conceal hidden information. In some implementations, the prediction output can indicate whether features are being modulated to conceal hidden information. For example, the prediction output can indicate whether features are being modulated and a corresponding certainty value without identifying which of the features that are being modulated.

Alternatively, in some implementations, the prediction output can indicate that features are being modulated, and can identify the particular features that are being modulated. For example, the prediction output can identify a subset of the features as being modulated to conceal hidden information, and can include a certainty value for each feature. In some implementations, the prediction output can specify the degree and/or type of modulation applied to the features being modulated. For example, if the transmission time of a packet is modulated to conceal hidden information by adding an artificial delay, the prediction output can identify that the transmission time is being modulated, and can further specify the length of time being artificially added to the transmission time. Examples of features of network events that can be modulated include, but are not limited to, a timestamp indicative of a time at which the network event occurred, a hop limit that controls a maximum number of hop network events allowed for a discrete information unit, a sequence number, a packet identifier, an address that identifies a network entity, etc.

In some implementations, the processing logic can obtain information indicative of subsequent set of discrete information units for transmission by the transmitting entity. More specifically, the transmitting entity can obtain information. For example, the transmitting entity can receive a request for information from a receiving entity, and can retrieve the information in response to the request. For another example, the transmitting entity may include, or receive, instructions that instruct the transmitting entity to iteratively obtain a certain type of information and transmit the information to the receiving entity on a set schedule. Once the information is obtained, the transmitting entity can divide, or "package" the information into the set of discrete information units. Prior to transmission of the set of discrete information units, the transmitting entity can provide information to the computing system that describes the set of discrete information units, and/or indicates that discrete information units are to be transmitted by the transmitting entity.

In some implementations, the discrete information units can be packets, and the processing logic can obtain network information that is descriptive of features of the packets, and features of network events that occurred for the packets (e.g., during transmission and/or reception of the packets). In some implementations, to process the network information with the machine-learned hidden information detection model, the processing logic can extract feature tuples for some (or all) of the plurality of packets. The feature tuples can indicate, or otherwise include, features of the packets and/or features of the network events that occurred for the packets. The processing logic can process the feature tuples with the machine-learned hidden information detection model to obtain the prediction output that indicates some (or all) of the features indicated by the feature tuples are modulated to conceal the hidden information. Additionally, or alternatively, in some implementations, the prediction output can identify the modulated features being modulated from the features included in the one or more feature tuples.

In some implementations, modulated features can be associated with a particular packet. Additionally, or alternatively, in some implementations, modulated features can be associated with each of the packets transmitted by the transmitting entity. Examples of modulated features can include, but are not limited to, a network event timestamp for a network event that occurred for the first packet, an originating process name for a first process from which the first packet originates, an originating process identifier for the first process, an identifier for a calling entity that calls the first process prior to creation of the first packet, a source Internet Protocol (IP) address, a source port identifier, a destination IP address, a destination port identifier, a service type associated with the first process, a transmission protocol associated with the first packet, geolocation data, etc.

In some implementations, the processing logic can process the feature tuples with the machine-learned hidden information detection model to obtain the prediction output, and the prediction output can identify the modulated feature(s) from the features included in the feature tuples. The modulated feature(s) can include sequence identifiers for the packets. The processing logic can cause the variance addition process to be performed for the set of discrete information units. The variance addition process can cause variance to be added to sequence identifiers for discrete information units of the set of discrete information units. For example, the variance addition process can switch the sequence identifiers between adjacent packets in the sequence.

In some implementations, the processing logic can process the feature tuples with the machine-learned hidden information detection model to obtain the prediction output, and the prediction output can identify the modulated feature(s) from the features included in the feature tuples. The modulated feature(s) can include transmission times for the packets. The processing logic can cause the variance addition process to be performed for the set of discrete information units. The variance addition process can cause variance to be added to the transmission times for discrete information units of the set of discrete information units. For example, the variance addition process can instruct the transmitting entity, or intermediate network devices, to add a variable delay between transmission of discrete information units.

In some implementations, the processing logic can process the feature tuples with the machine-learned hidden information detection model to obtain the prediction output, and the prediction output can identify the modulated feature(s) from the features included in the feature tuples. The modulated feature(s) can include hop limits for the packets. The processing logic can cause the variance addition process to be performed for the set of discrete information units. The variance addition process can cause variance to be added to the hop limits for discrete information units of the set of discrete information units. For example, the variance addition process can directly modify, or can instruct the transmitting entity to modify, the hop limits of particular packets prior to transmission of the particular packets.

At operation 215, processing logic can, based on the prediction output, cause a variance addition process to be performed for an additional set of discrete information units that is to be transmitted by the transmitting entity. The variance addition process can cause variance to be added to features of future network events for at least some of the discrete information units. In some implementations, the processing logic can perform the variance addition process by instructing other entities to add variance to discrete information units received by the entity, and/or network events associated with discrete information units received by the entity. For example, if the processing logic determines that hidden information is being modulated using the transmission time of discrete information units, the processing logic can send instructions to the transmitting entity, and/or any intermediate network entities (e.g., router devices, etc.), to add an artificial delay between transmission of discrete information units. Issuing instructions to other entities to cause the variance addition process to be performed will be discussed in greater detail with regards to FIG. 4.

In some implementations, the processing logic can evaluate a loss function that evaluates a difference between the prediction output and a ground truth prediction output. For example, the network information can describe features of network events that are known to be modulated with hidden information. If the prediction output indicates that the features are not modulated with hidden information, the loss function can evaluate the difference between the prediction output and the known ground truth that the features were modulated. Based on the loss function, the processing logic can modify values of parameters of the machine-learned hidden information detection model.

Figure 3:
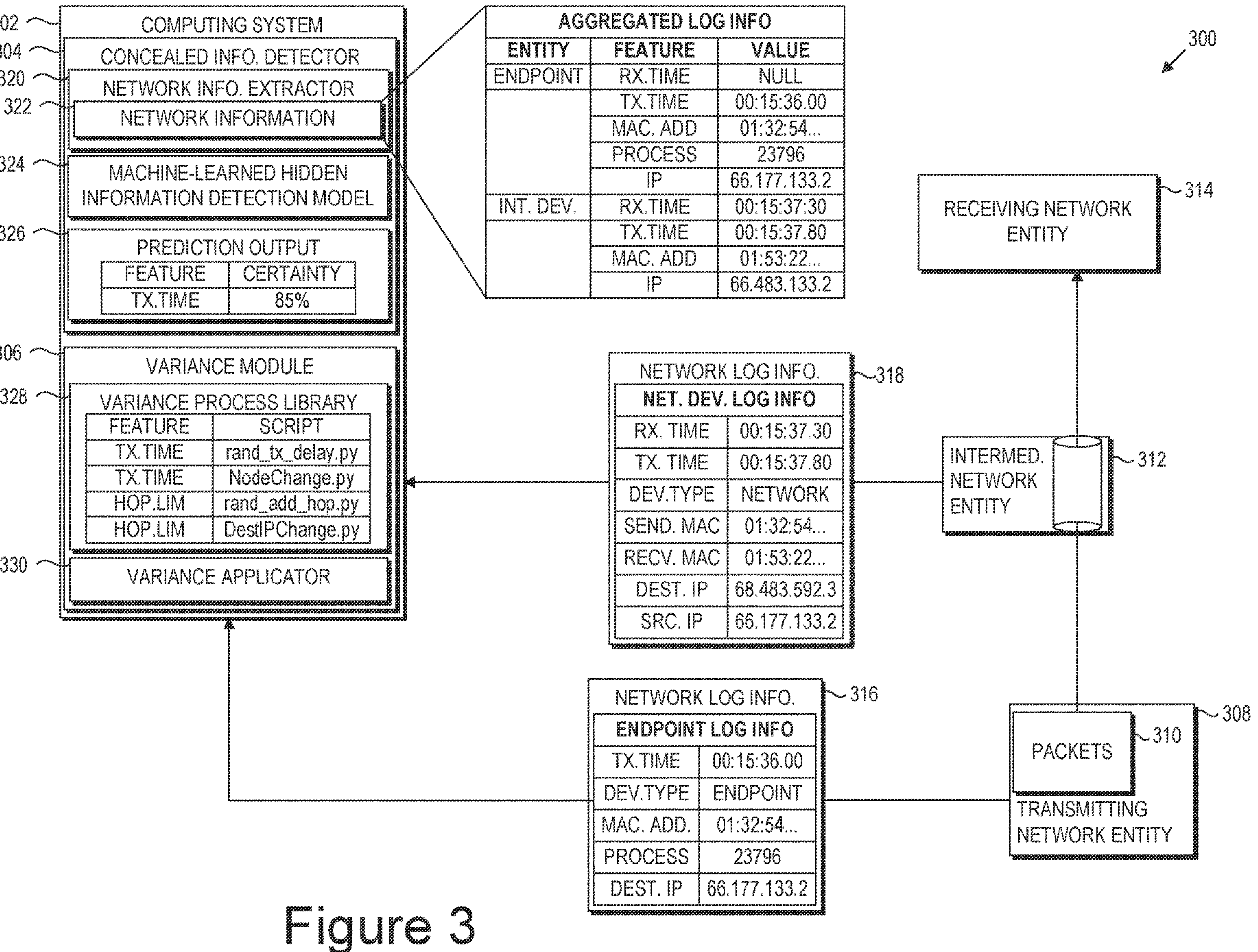
FIG. 3 is a detailed block diagram for processing network information with a machine-learned hidden information model to identify threat vectors and features utilized to conceal hidden information according to some implementations of the present disclosure.

FIG. 3 is a detailed block diagram 300 for processing network information with a machine-learned hidden information model to identify threat vectors and features utilized to conceal hidden information according to some implementations of the present disclosure. More specifically, a computing system 302 (e.g., the computing system 102 of FIG. 1, etc.) can include a concealed information detector 304 and a variance module 306 as described with regards to the concealed information detector 114 and the variance module 122 of FIG. 1.

A transmitting network entity 308 can transmit packets 310 to an intermediate network entity 312, and the intermediate network entity 312 can forward the packets 310 to a receiving network entity 314. The transmitting network entity 308 can be any type or manner of device, virtualized instance, computing system, etc. For example, the transmitting network entity 308 may be a containerized application instance executed or otherwise implemented by the computing system 302. For another example, the transmitting network entity 308 can be a user device (e.g., smartphone, laptop, wearable device, Mixed Reality (MR) device, etc.) that is connected to a secure network to which the computing system 302 is assigned. Similarly, the intermediate network entity 312 can be any type or manner of device or virtualized instance that serves to facilitate the transmission of discrete information units from the transmitting network entity 308 to the receiving network entity 314. Examples of intermediate network devices include network nodes (e.g., virtualized nodes, physical nodes such as base stations, etc.), router devices, gateway devices (e.g., to mediate access to the secured network, etc.), etc.

The receiving network entity 314 can be any type or manner of device, system, virtualized instance, etc. as described with regards to the transmitting network entity 308. In some implementations, the receiving network entity 314 can be associated with a malicious entity. For example, the receiving network entity 314 may be a computing device that is configured to extract hidden information that has been modulated into the packets 310. For another example, the receiving network entity 314 may be a computing device that is associated with a non-malicious entity (e.g., a user, a business entity, an automated user, etc.) that has been infected with malicious instructions by a malicious entity. The malicious instructions can instruct the receiving network entity 314 to extract the hidden information from the packets 310, or may instruct the receiving network entity 314 to forward the packets 310 to some other device or system that is configured to extract the hidden information.

The transmitting network entity 308 can transmit the packets 310 to the intermediate network entity 312. Upon transmission of one, or all, of the packets 310, the transmitting network entity 308 can generate network log information 316 and can transmit the network log information 316 to the computing system 302. The network log information 316 can describe features of the network event that occurred at the transmitting network entity 308—specifically, transmission of the packets 310. To follow the depicted example, assume that the transmitting network entity 308 transmits all of the packets 310 prior to generating the network log information 316. In some implementations, the network log information 316 can indicate a transmission time for each of the packets (not illustrated), or some other type of temporal feature (e.g., a time at which the first or last packet of the packets 310 were transmitted, an average delay between packet transmission, a specific delay between transmission of each of the packets 310, etc.).

In some implementations, the network log information 316 can indicate a device type for the transmitting network entity 308. For example, the network log information 316 indicates that the transmitting network entity 308 is an endpoint device, which refers to some device that serves as the initial transmitter of information or the final receiver of information. In some implementations, the network log information 316 can indicate identifiers for the transmitting network entity 308, such as a MAC address, a source IP (e.g., the IP address of the transmitting network entity 308), etc. In some implementations, the network log information 316 can indicate features of the process the generated the packets 310, or the information encapsulated within the packets 310 (e.g., a process name, a process ID, etc.).

The intermediate network entity 312 can receive the packets 310. In some implementations, the intermediate network entity 312 can identify receipt of the packets 310 as a network event, and can generate network log information 318 descriptive of the network event. The intermediate network entity 312 can forward the packets 310 to the receiving network entity 314. In some implementations, the intermediate network entity 312 can identify forwarding of the packets 310 as a network event, and can generate the network log information 318 descriptive of the network event. The network log information 318 can indicate the same, or similar, information as that of the network log information 316.

The concealed information detector 304 of the computing system 302 can include a network information extractor 320. The network information extractor 320 can aggregate and/or extract network information 322 from the network log information 316 and 318. In some implementations, the network information 322 can be or otherwise include the network log information 316 and 318. Additionally, or alternatively, in some implementations, the network information extractor 320 can aggregate the network log information 316 and 318 to obtain the network information 322, and the network information 322 can include aggregated log information. The aggregated log information can indicate some (or all) of the features indicated by the network log information 316 and 318. Alternatively, in some implementations, the network information extractor 320 can extract feature tuples from the network log information 316 and 318 (with or without aggregation). The network information 322 can indicate the extracted feature tuples. In some implementations, the extracted feature tuples can include features that can be modulated with hidden information while excluding features that cannot be modulated with hidden information (e.g., a unique identifier of the transmitting network entity 308 or the intermediate network entity 312, etc.). Additionally, or alternatively, in some implementations, the extracted feature tuples can include features that have previously been modulated with hidden information.

The concealed information detector 304 can include a machine-learned hidden information detection model 324. The machine-learned hidden information detection model 324 can be trained to process the network information 322 to obtain a prediction output 326. The prediction output 326 can identify whether features indicated by the network information 322 are being modulated with hidden information. Additionally, or alternatively, in some implementations, the prediction output can identify the feature(s) being modulated with the hidden information. To follow the depicted example, the prediction output 326 can indicate that, with an 85% degree of certainty, the transmission time feature is being modulated with hidden information.

As described previously, in some implementations, the network information 322 can include feature tuples extracted from the network log information 318, and the feature tuples can be processed by the machine-learned hidden information detection model 324 to obtain the prediction output 326. However, in some alternative implementations, the network information 322 can include aggregated log information, and the machine-learned hidden information detection model 324 can process the aggregated log information to extract the feature tuples from the aggregated log information. In this instance, the extracted feature tuples can be or otherwise be indicated by the prediction output, and the features included in the extracted feature tuples can be features predicted to be modulated with hidden information.

The variance module 306 can perform a variance addition process based on the prediction output 326. More specifically, the prediction output 326 can, in some implementations, identify a particular feature being modulated with hidden information. The variance module 306 can include a variance process library 328 that associates types of features being modulated with specific variance addition processes. In other words, if the prediction output 326 identifies a particular feature being modulated, the variance module 306 can select a variance addition process from the variance process library 328 that is designed to add variance to that particular feature. To follow the depicted example, if the prediction output 326 identifies a transmission time for the packets 310 as a feature being modulated, the variance module 306 can select a "rand_tx_delay.py" script that causes variance to be added to the transmission time of the packets 310. For example, execution of the script by the variance module 306 may cause the computing system 302 to instruct the transmitting network entity 308 to add a variable delay between transmission of subsequent packets.

Figure 4:
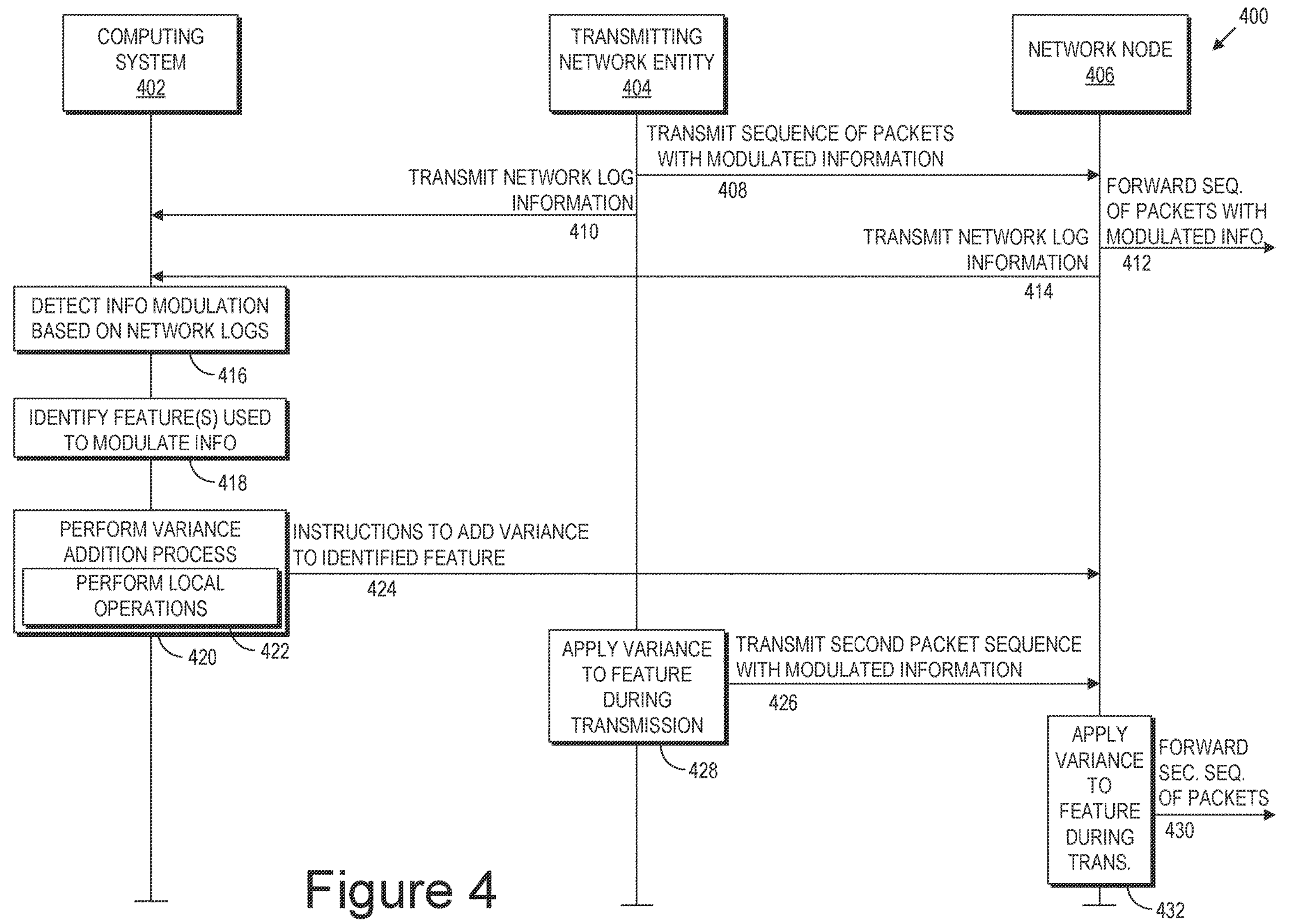
FIG. 4 is a communication flow diagram for performing a variance addition process to cause variance to be added to features of network events according to some implementations of the present disclosure.

FIG. 4 is a communication flow diagram 400 for performing a variance addition process to cause variance to be added to features of network events according to some implementations of the present disclosure. More specifically, a computing system 402 can implement various security features in a secured network. A secured network generally refers to a network that mediates access to certain information or systems based on access credentials). A transmitting network entity 404 can be located within the secured network, or can utilize the secured network to send and receive information. A network node 406 can be an intermediate network entity, such as a router device, that receives packets from the transmitting network entity 404 and forwards the packets to another network node or to a receiving network entity.

At 408, the transmitting network entity 404 can transmit a sequence of packets that has been modulated with hidden information to the network node 406. As transmission of the sequence of packets can constitute a network event, at 410, the transmitting network entity 404 can provide network log information to the computing system 402 as described with regards to FIG. 3.

Upon receipt of the sequence of packets, at 412, the network node 406 can forward the sequence of packets. In some implementations, the receipt of the sequence of packets from the transmitting network entity 404 can constitute a network event and the network node 406 can transmit network log information to the computing system 402. Additionally, or alternatively, the forwarding of the packets can constitute a network event, and at 414, the network node 406 can transmit network log information to the computing system 402. In some implementations, the network log information transmitted to the transmitting network entity 404 can indicate features associated with both receiving the packets and forwarding the packets. Alternatively, in some implementations, the network log information transmitted to the transmitting network entity 404 can indicate features associated with forwarding the packets.

The computing system 402 can receive the network log information from the transmitting network entity 404 and the network node 406. At 416, the computing system 402 can detect modulation based on the network log information as described with regards to FIG. 3. Similarly, at 418, the computing system 402 can identify the feature(s) used to modulate the hidden information based on the network log information as described with regards to FIG. 3.

At 420, the computing system 402 can perform a variance addition process. The variance addition process can cause variance to be added to features of future network events for discrete information units to be transmitted in the future by the transmitting network entity 404 and/or the network node 406. In some implementations, the variance addition process can be performed for another sequence of discrete information units the transmitting network entity 404 is to transmit subsequent to transmission of the prior sequence of discrete information units. Additionally, or alternatively, in some implementations, the variance addition process can be performed for the transmitting network entity 404.

In some implementations, at 422, the computing system 402 can perform the variance addition process by performing local operations. For example, assume that the computing system 402 includes a policy control module that controls policy for the secured network. The computing system 402 can perform local operations to modify policy implemented by the policy control module to directly or indirectly add variance (e.g., adding a policy that stipulates random addition of variance for a particular feature, etc.).

Additionally, or alternatively, in some implementations, at 424, the computing system 402 can perform the variance addition process by instructing the transmitting network entity 404, and/or the network node 406, to add variance to the identified feature. For example, if the feature is a destination IP address (e.g., the address of the network node 406), the computing system 402 can instruct the transmitting network entity 404 to modify the destination IP so that subsequent packet(s) are transmitted to some other network node. For another example, if the feature is a reception time, the transmitting network entity 404 can instruct the network node 406 to randomly select a different network node to forward subsequent packets to rather than the receiving network entity, thus indirectly adding variance to the reception time of the packet(s).

In some implementations at 426, the transmitting network entity 404 can transmit another sequence of packets with modulated information. Prior to transmission, or concurrently with transmission, at 428 the transmitting network entity 404 can apply variance to the feature. For example, if instructed to add variance to a transmission time feature, the transmitting network entity 404 can randomly select a particular delay, and can insert the delay between each of the packets to be transmitted.

Similarly, in some implementations at 430, the network node 406 can forward the received sequence of packets with modulated information. Prior to forwarding, or concurrently with forwarding, at 432 the network node 406 can apply variance to the feature. For example, if instructed to add variance to a destination IP feature, the network node 406 can randomly select a different intermediate destination for a subset of the sequence of packets.

Figure 5:
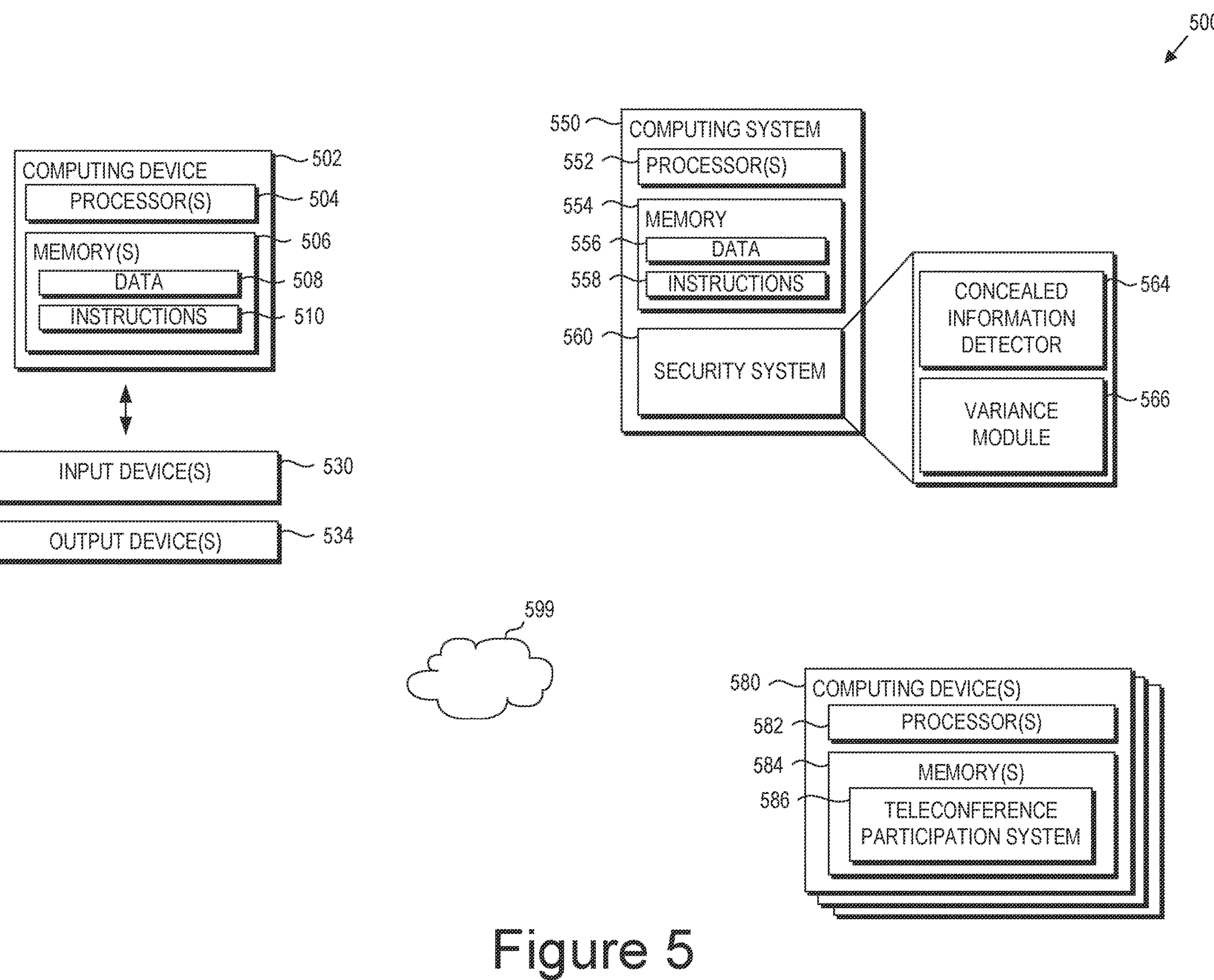
FIG. 5 depicts a block diagram of an example computing environment that performs detection of concealed information and mitigation via introduction of deliberate variance according to example implementations of the present disclosure.

FIG. 5 depicts a block diagram of an example computing environment 500 that performs detection of concealed information and mitigation via introduction of deliberate variance according to example implementations of the present disclosure. The computing environment 500 includes a computing device 502, a computing system 550, and, in some implementations, other computing device(s) 580 respectively associated with other participants(s) in the teleconference.

The computing device 502 can be any type of computing device, such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), etc.

In particular, the computing device 502 can, in some implementations, be a device or system that transmits information via a network, and generally may be referred to as a transmitting network entity. Additionally, or alternatively, the computing device 502 may be or otherwise refer to a receiving network entity that receives information (directly or indirectly) transmitted by the transmitting network entity.

The computing device 502 includes processor(s) 504 and memory(s) 506. The processor(s) 504 can be any suitable processing device (e.g., a processor core, a microprocessor, an ASIC, an FPGA, a controller, a microcontroller, etc.) and can be one processor or processors that are operatively connected. The memory 506 can include non-transitory computer-readable storage media(s), such as RAM, ROM, EEPROM, EPROM, flash memory devices, magnetic disks, etc., and combinations thereof. The memory 506 can store data 508 and instructions 510 which are executed by the processor 504 to cause the computing device 502 to perform operations.

The computing device 502 can also include input device(s) 530 that receive inputs from a participant, or otherwise capture data associated with a participant. For example, the input device(s) 530 can include a touch-sensitive device (e.g., a touch-sensitive display screen or a touch pad) that is sensitive to the touch of a participant input object (e.g., a finger or a stylus). The touch-sensitive device can serve to implement a virtual keyboard. Other example participant input components include a microphone, a traditional keyboard, or other means by which a participant can provide user input.

In some implementations, the computing device 502 can include, or can be communicatively coupled to, input device(s) 530. For example, the input device(s) 530 can include a camera device that can capture two-dimensional video data of a participant associated with the computing device 502 (e.g., for broadcasting, etc.). In some implementations, the input device(s) 530 can include a number of camera devices communicatively coupled to the computing device 502 that are configured to capture image data from different perspectives for generation of three-dimensional pose data/representations (e.g., a representation of a user of the computing device 502, etc.).

In some implementations, the input device(s) 530 can include sensor devices configured to capture sensor data indicative of movements of a participant associated with the computing device 502 (e.g., accelerometer(s), Global Positioning Satellite (GPS) sensor(s), gyroscope(s), infrared sensor(s), head tracking sensor(s) such as magnetic capture system(s), an omni-directional treadmill device, sensor(s) configured to track eye movements of the user, etc.).

In some implementations, the computing device 502 can include, or be communicatively coupled to, output device(s) 534. Output device(s) 534 can be, or otherwise include, device(s) configured to output audio data, image data, video data, etc. For example, the output device(s) 534 can include a two-dimensional display device (e.g., a television, projector, smartphone display device, etc.). For another example, the output device(s) 534 can include display devices for an augmented reality device or virtual reality device.

The computing system 550 includes processor(s) 552 and a memory 554. The processor(s) 552 can be any suitable processing device (e.g., a processor core, a microprocessor, an ASIC, an FPGA, a controller, a microcontroller, etc.) and can be one processor or processors that are operatively connected. The memory 554 can include non-transitory computer-readable storage media(s), such as RAM, ROM, EEPROM, EPROM, flash memory devices, magnetic disks, etc., and combinations thereof. The memory 554 can store data 556 and instructions 558 which are executed by the processor 552 to cause the computing system 550 to perform operations.

In some implementations, the computing system 550 can be an entity that operates within a network, and as such, may be referred to as a network entity (e.g., a transmitting network entity, a receiving network entity, etc.). Additionally, or alternatively, in some implementations, the computing system 550 can be a computing system that implements security features and services within a secured network, such as the computing systems 102, 302, and 402 of FIGS. 1, 3, and 4, respectively.

In some implementations, the computing system 550 can be, or otherwise include, a virtual machine or containerized unit of software instructions executed within a virtualized cloud computing environment (e.g., a distributed, networked collection of processing devices), and can be instantiated on request (e.g., in response to detection of modulated information, etc.). Additionally, or alternatively, in some implementations, the computing system 550 can be, or otherwise include, physical processing devices, such as processing nodes within a cloud computing network (e.g., nodes of physical hardware resources).

The computing system 550 can implement various security features and services using a security system 560. More specifically, the computing system 550 can utilize the security system 560 to detect modulation of hidden information, and perform a variance addition process to introduce deliberate variance to obfuscate such hidden information. To do so, the security system 560 can include a concealed information detector 564. The concealed information detector 564 can detect hidden information that has been concealed by modulating the hidden information within features of network events as described with regards to FIGS. 1 and 3. The security system 560 can also include a variance module 566. The variance module 566 can cause a variance addition process to be performed to add variance to identified features.

In some implementations, the computing system 550 includes, or is otherwise implemented by, server computing device(s). In instances in which the computing system 550 includes multiple server computing devices, such server computing devices can operate according to sequential computing architectures, parallel computing architectures, or some combination thereof.

In some implementations, the transmission and reception of data by computing system 550 can be accomplished via the network 599. For example, in some implementations, the computing device 502 can capture video data, audio data, multimedia data (e.g., video data and audio data, etc.), sensor data, etc. and transmit the data to the computing system 550. The computing system 550 can receive the data via the network 599.

In some implementations, the computing system 550 can receive data from the computing device(s) 502 and 580 according to various encryption scheme(s) (e.g., codec(s), lossy compression scheme(s), lossless compression scheme(s), etc.). For example, the computing device 502 can encode audio data with an audio codec, and then transmit the encoded audio data to the computing system 550. The computing system 550 can decode the encoded audio data with the audio codec. In some implementations, the computing device 502 can dynamically select between a number of different codecs with varying degrees of loss based on conditions (e.g., available network bandwidth, accessibility of hardware/software resources, etc.) of the network 599, the computing device 502, and/or the computing system 550. For example, the computing device 502 can dynamically switch from audio data transmission according to a lossy encoding scheme to audio data transmission according to a lossless encoding scheme based on a signal strength between the computing device 502 and the network 599.

The computing system 550 and the computing device 502 can communicate with the computing device(s) 580 via the network 599. The computing device(s) 580 can be any type of computing device(s), such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

In particular, the network 599 can, in some instances, be a secured network that mediates access to particular devices or systems, such as the computing system 550. The network 599 can be secured against external entities by security services and features implemented by the computing system 550 (e.g., the security system 560, etc.) and/or other device(s) and system(s) that provide various security features and services. For example, access to the network 599 can require access credentials granted by the security system 560. The security system 560 can receive an authentication request from a network entity (e.g., an entity initially connecting to the network 599). If the network entity is not previously authenticated, the security system 560 can authenticate the network entity. The network 599 can enforce various security protocols, such as mandatory encryption protocols and the like, in conjunction with the security system 560. In addition, the network 599 can interface with systems and other networks and/or network infrastructure that is external to the network 599.

The computing device(s) 580 includes processor(s) 582 and a memory 584 as described with regards to the computing device 502. Specifically, the computing device(s) 580 can be the same, or similar, device(s) as the computing device 502. For another example, the computing device(s) 580 may include, or may be communicatively coupled to, the same type of input and output devices as described with regards to input device(s) 530 and output device(s) 534. Alternatively, in some implementations, the computing device(s) 580 can be different devices than the computing device 502, but can also facilitate teleconferencing with the computing system 550. For example, the computing device 502 can be a laptop and the computing device(s) 580 can be smartphone(s).

The network 599 can be any type of communications network, such as a local area network (e.g., intranet), wide area network (e.g., Internet), or some combination thereof and can include any number of wired or wireless links. In general, communication over the network 599 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). In some implementations, the network 599 may be, or implement, a service architecture that is implemented at least in part using a network or various network technologies.

Specifically, in some implementations, the network 599 can refer to a networked series of physical and/or virtualized computing devices that collectively implement a cloud computing service. For example, the network 599 can communicatively connect a distributed computing environment (e.g., content data networks, server pools, etc.) for the purposes of providing cloud services to subscribers. The security system 560 can provide security services and related enforcement against internal threats, such as malicious entities posing as legitimate subscribers to the cloud service, and external threats, such as malicious entities attempting to gain unauthorized access to the cloud service and/or information of cloud service subscribers.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

The following definitions provide a detailed description of various terms discussed throughout the subject specification. As such, it should be noted that any previous reference in the specification to the following terms should be understood in light of these definitions.

Cloud: as used herein, the term "cloud" or "cloud computing environment" generally refers to a network of interconnected computing devices (e.g., physical computing devices, virtualized computing devices, etc.) and associated storage media which interoperate to perform computational operations such as data storage, transfer, and/or processing. In some implementations, a cloud computing environment can be implemented and managed by an information technology (IT) service provider. The IT service provider can provide access to the cloud computing environment as a service to various users, who can in some circumstances be referred to as "cloud customers."

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one implementation can be used with another implementation to yield a still further implementation. Thus, it is intended that the present disclosure cover such alterations, variations, and equivalents.

What is claimed is:

1. A computer-implemented method, comprising:

obtaining, by a computing system comprising one or more computing devices, network information for a plurality of discrete information units transmitted by a transmitting entity, wherein the network information is descriptive of temporal features of network events that occurred for the plurality of discrete information units;

processing, by the computing system, the network information with a machine-learned hidden information detection model to obtain a prediction output indicating that the temporal features of the network events that occurred for the plurality of discrete information units are modulated to conceal hidden information; and based on the prediction output, causing, by the computing system, a variance addition process to be performed for a second plurality of discrete information units to be transmitted by the transmitting entity, wherein the variance addition process causes deliberate variance to be added to temporal features of future network events for at least some of the second plurality of discrete information units.

2. The computer-implemented method of claim 1, wherein the network events that occurred for the plurality of discrete information units comprise at least one of:

receipt of a discrete information unit of the plurality of discrete information units by a receiving entity;

occurrence of a hop from one network segment to another network segment; or transmission of a discrete information unit of the plurality of discrete information units by the transmitting entity.

3. The computer-implemented method of claim 1, wherein, for each of the plurality of discrete information units, the temporal features of the network events that are modulated to conceal the hidden information comprise at least one of:

a timestamp indicative of a time at which a network event occurred;

a hop limit that controls a maximum number of hop network events allowed for a discrete information unit;

a sequence number;

a packet identifier; or an address that identifies a network entity.

4. The computer-implemented method of claim 1, wherein processing the network information with the machine-learned hidden information detection model further comprises:

obtaining, by the computing system, information indicative of the second plurality of discrete information units for transmission by the transmitting entity.

5. The computer-implemented method of claim 1, wherein the plurality of discrete information units respectively comprises a plurality of packets.

6. The computer-implemented method of claim 5, wherein obtaining the network information comprises:

obtaining, by the computing system, the network information for the plurality of packets transmitted by the transmitting entity, wherein the network information is descriptive of:

features of the plurality of packets; and features of the network events that occurred for the plurality of packets.

7. The computer-implemented method of claim 6, wherein processing the network information with the machine-learned hidden information detection model to obtain the prediction output comprises:

extracting, by the computing system, one or more feature tuples for one or more packets of the plurality of packets, wherein each of the one or more feature tuples is indicative of at least one of:

features of the plurality of packets; or temporal features of the network events that occurred for the plurality of packets; and processing, by the computing system, the one or more feature tuples with the machine-learned hidden information detection model to obtain the prediction output indicating that features indicated by the one or more feature tuples are modulated to conceal the hidden information.

8. The computer-implemented method of claim 7, wherein processing the one or more feature tuples with the machine-learned hidden information detection model comprises:

processing, by the computing system, the one or more feature tuples with the machine-learned hidden information detection model to obtain the prediction output, wherein the prediction output identifies one or more modulated features from features included in the one or more feature tuples, and wherein the one or more modulated features are modulated to conceal the hidden information.

9. The computer-implemented method of claim 8, wherein a first modulated feature of the one or more modulated features is associated with a first packet of the one or more packets, and wherein the first modulated feature comprises:

a network event timestamp for a network event that occurred for the first packet;

an originating process name for a first process from which the first packet originates;

an originating process identifier for the first process;

an identifier for a calling entity that calls the first process prior to creation of the first packet;

a source Internet Protocol (IP) address;

a source port identifier;

a destination IP address;

a destination port identifier;

a service type associated with the first process;

a transmission protocol associated with the first packet; or geolocation data.

10. The computer-implemented method of claim 8, wherein the method further comprises:

evaluating, by the computing system, a loss function that evaluates a difference between the prediction output and a ground truth prediction output; and modifying, by the computing system, values of parameters of the machine-learned hidden information detection model based on the loss function.

11. The computer-implemented method of claim 8, wherein processing the one or more feature tuples with the machine-learned hidden information detection model comprises:

processing, by the computing system, the one or more feature tuples with the machine-learned hidden information detection model to obtain the prediction output, wherein the prediction output identifies the one or more modulated features from the features included in the one or more feature tuples, and wherein the one or more modulated features comprise sequence identifiers for the one or more packets.

12. The computer-implemented method of claim 11, wherein causing the variance addition process to be performed for the second plurality of discrete information units comprises:

causing, by the computing system, the variance addition process to be performed for the second plurality of discrete information units, wherein the variance addition process causes variance to be respectively added to one or more sequence identifiers for one or more discrete information units of the second plurality of discrete information units.

13. The computer-implemented method of claim 8, wherein processing the one or more feature tuples with the machine-learned hidden information detection model comprises:

processing, by the computing system, the one or more feature tuples with the machine-learned hidden information detection model to obtain the prediction output, wherein the prediction output identifies the one or more modulated features from the features included in the one or more feature tuples, and wherein the one or more modulated features comprises transmission times for the one or more packets.

14. The computer-implemented method of claim 13, wherein causing the variance addition process to be performed for the second plurality of discrete information units comprises:

causing, by the computing system, the variance addition process to be performed for the second plurality of discrete information units, wherein the variance addition process causes a variable delay to be added during transmission of the second plurality of discrete information units.

15. The computer-implemented method of claim 8, wherein processing the one or more feature tuples with the machine-learned hidden information detection model comprises:

processing, by the computing system, the one or more feature tuples with the machine-learned hidden information detection model to obtain the prediction output, wherein the prediction output identifies the one or more modulated features from the features included in the one or more feature tuples, and wherein the one or more modulated features comprise hop limits for the one or more packets.

16. The computer-implemented method of claim 15, wherein causing the variance addition process to be performed for the second plurality of discrete information units comprises:

causing, by the computing system, the variance addition process to be performed for the second plurality of discrete information units, wherein the variance addition process modifies a hop limit of one or more discrete information units of the second plurality of discrete information units.

17. A computing system, comprising:

one or more processors; and one or more non-transitory computer-readable media that store instructions that, when executed by the one or more processors, cause the computing system to perform operations, the operations comprising:

obtaining network information for a plurality of packets transmitted by a transmitting entity, wherein the network information is descriptive of temporal features of network events that occurred during transmission of the plurality of packets;

extracting one or more feature tuples for one or more packets of the plurality of packets, wherein each of the one or more feature tuples is indicative of the temporal features of the network events that occurred for the plurality of packets;

processing the one or more feature tuples with a machine-learned hidden information detection model to obtain a prediction output that identifies one or more modulated features from features included in the one or more feature tuples, and wherein the one or more modulated features are modulated to conceal hidden information;

obtaining information indicative of a second plurality of packets for transmission by the transmitting entity; and based on the prediction output, causing a variance addition process to be performed for the second plurality of packets, wherein the variance addition process causes deliberate variance to be added to the temporal features of future network events for at least some of the second plurality of packets.

18. The computing system of claim 17, wherein the network events that occurred for the plurality of packets comprises at least one of:

receipt of a discrete information unit of the plurality of packets by a receiving entity;

occurrence of a hop from one network segment to another network segment; or transmission of a packet of the plurality of packets by the transmitting entity.

19. The computing system of claim 17, wherein the one or more modulated features comprise at least one of:

a timestamp indicative of a time at which a network event occurred;

a hop limit that controls a maximum number of hop network events allowed for a discrete information unit;

a sequence number;

a packet identifier; or an address that identifies a network entity.

20. One or more non-transitory computer-readable media that store instructions that, when executed by one or more processors, cause the one or more processors to perform operations, the operations comprising:

obtaining network information for a plurality of discrete information units transmitted by a transmitting entity, wherein the network information is descriptive of temporal features of network events that occurred for the plurality of discrete information units;

processing the network information with a machine-learned hidden information detection model to obtain a prediction output indicating that the temporal features of the network events that occurred for the plurality of discrete information units are modulated to conceal hidden information; and based on the prediction output, causing a variance addition process to be performed for the transmitting entity, wherein the variance addition process causes deliberate variance to be added to temporal features of future network events for future transmissions of discrete information units by the transmitting entity.

* * * * *